(12) United States Patent
Lim et al.

(10) Patent No.: US 10,362,650 B2
(45) Date of Patent: Jul. 23, 2019

(54) DRIVING CIRCUIT AND LIGHTING APPARATUS FOR LIGHT EMITTING DIODE

(71) Applicant: Seoul Semiconductor Co., Ltd., Ansan-si (KR)

(72) Inventors: Kwang Bea Lim, Ansan-si (KR); Sung Ho Jin, Ansan-si (KR); Sang Wook Han, Ansan-si (KR); Young Do Jong, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 16/039,349

(22) Filed: Jul. 19, 2018

(65) Prior Publication Data

US 2018/0332681 A1 Nov. 15, 2018

Related U.S. Application Data

(62) Division of application No. 15/152,256, filed on May 11, 2016, now Pat. No. 10,051,702.

(30) Foreign Application Priority Data

Aug. 21, 2015 (KR) .................. 10-2015-0118034
Dec. 30, 2015 (KR) .................. 10-2015-0189712

(51) Int. Cl.
*H05B 33/08* (2006.01)
*H05B 37/02* (2006.01)

(52) U.S. Cl.
CPC ....... *H05B 33/0845* (2013.01); *H05B 33/083* (2013.01); *H05B 33/0809* (2013.01); *H05B 37/0227* (2013.01); *H05B 37/0281* (2013.01)

(58) Field of Classification Search
CPC ............ H05B 33/0845; H05B 37/0227; H05B 33/083; H05B 37/0281; H05B 33/0809
(Continued)

(56) References Cited

U.S. PATENT DOCUMENTS 8,884,537 B2 * 11/2014 Liao .................... G05F 1/10
315/179
9,214,851 B1 * 12/2015 Mao ................... H02M 1/08
(Continued)

FOREIGN PATENT DOCUMENTS

CN 102625514 8/2012
EP 2544512 1/2013
(Continued)

OTHER PUBLICATIONS

Extended European Search Report dated Jan. 20, 2017 in European Patent Application No. 16169147.2.
(Continued)

*Primary Examiner* — Don P Le
(74) *Attorney, Agent, or Firm* — H.C. Park & Associates, PLC

(57) ABSTRACT

A driving circuit for a light emitting diode connected to a TRIAC dimmer configured to modulate an input AC voltage depending on a selected dimming level including a rectifier configured to full-wave rectify the modulated AC voltage output from the TRIAC dimmer to generate and output a driving voltage, a driving module configured to receive the driving voltage of the rectifier to detect the selected dimming level and drive a plurality of light emitting diode groups depending on the detected dimming level, and a bleeder circuit configured to provide a bleeder current to the TRIAC dimmer, in which the bleeder circuit is configured to provide the bleeder current only for a preset on-duty time.

15 Claims, 12 Drawing Sheets

(58) Field of Classification Search
USPC .......................................................... 315/201
See application file for complete search history.

(56) References Cited

U.S. PATENT DOCUMENTS

| | | | |
|---|---|---|---|
| 9,307,593 B1* | 4/2016 | Wang | H05B 33/0818 |
| 2011/0193494 A1 | 8/2011 | Gaknoki et al. | |
| 2011/0248640 A1 | 10/2011 | Welten | |
| 2012/0081009 A1 | 4/2012 | Shteynberg et al. | |
| 2012/0188794 A1 | 7/2012 | Chang et al. | |
| 2012/0319621 A1 | 12/2012 | Sutardja et al. | |
| 2013/0009616 A1 | 1/2013 | Chang et al. | |
| 2013/0106298 A1 | 5/2013 | Datta et al. | |
| 2013/0241427 A1* | 9/2013 | Kesterson | H05B 37/02 315/210 |
| 2013/0342122 A1 | 12/2013 | Sawada | |
| 2014/0103823 A1 | 4/2014 | Kahlman et al. | |
| 2014/0103825 A1 | 4/2014 | Tao et al. | |
| 2014/0159616 A1 | 6/2014 | Wang et al. | |
| 2014/0265688 A1 | 9/2014 | Ekbote | |
| 2014/0292217 A1 | 10/2014 | Shin et al. | |
| 2014/0333228 A1* | 11/2014 | Angeles | H05B 33/0815 315/291 |
| 2014/0375223 A1 | 12/2014 | Tao et al. | |
| 2015/0103568 A1* | 4/2015 | Del Carmen, Jr. | H02M 3/33507 363/21.16 |
| 2015/0181669 A1* | 6/2015 | van den Broeke | H05B 33/0815 315/200 R |
| 2016/0134187 A1 | 5/2016 | Pregitzer et al. | |
| 2016/0135257 A1* | 5/2016 | Gaknoki | H05B 33/08 315/309 |
| 2016/0183340 A1 | 6/2016 | Lee et al. | |
| 2016/0366743 A1 | 12/2016 | Datta et al. | |
| 2017/0094738 A1* | 3/2017 | Garner | H05B 39/04 |
| 2017/0354002 A1 | 12/2017 | Eum et al. | |
| 2018/0220502 A1 | 8/2018 | Morales et al. | |

FOREIGN PATENT DOCUMENTS

| | | |
|---|---|---|
| EP | 2741585 | 6/2014 |
| KR | 10-2015-0016084 | 2/2015 |
| KR | 10-2016-0049961 | 5/2016 |
| WO | 2011/114250 | 9/2011 |
| WO | 2012/168844 | 12/2012 |

OTHER PUBLICATIONS

Office Action dated Mar. 20, 2018, in the Chinese Patent Application No. 201610218678.6.
Non-Final Office Action dated Nov. 15, 2017, issued in U.S. Appl. No. 15/152,256.
Notice of Allowance dated Apr. 12, 2018, issued in U.S. Appl. No. 15/152,256.
Notice of Allowance dated Mar. 13, 2019 issued in U.S. Appl. No. 16/039,345.
Non-Final Office Action dated Nov. 20, 2018 issued in U.S. Appl. No. 16/039,345.

* cited by examiner

EX.) Phase = 180°

EX.) Phase = 90°

DRIVING CIRCUIT AND LIGHTING APPARATUS FOR LIGHT EMITTING DIODE

CROSS-REFERENCE TO RELATED APPLICATIONS

This application is a Divisional of U.S. patent application Ser. No. 15/152,256, filed on May 11, 2016, and claims priority from and the benefit of Korean Patent Application No. 10-2015-0118034, filed on Aug. 21, 2015, and Korean Patent Application No. 10-2015-0189712, filed on Dec. 30, 2015, which are hereby incorporated by reference for all purposes as if fully set forth herein.

BACKGROUND

Field

The present invention relates to a driving circuit and a lighting apparatus for a light emitting diode, and more particularly, to a driving circuit and a lighting apparatus for a light emitting diode capable of improving a flicker, light efficiency, and electrical characteristics.

Discussion of the Background

Generally, a diode device for light emission such as a light emitting diode (LED) may be driven only by direct current (DC) power due to diode characteristics. Therefore, a light emitting apparatus using the existing light emitting diode has been restrictively used and should include separate circuits such as a switching mode power supply (SMPS) in order to be driven by alternating current (AC) power of 220V that is currently being used at home. Therefore, there is a problem in that a circuit of the light emitting apparatus is becoming more complicated and manufacturing costs thereof are rising.

In order to solve these problems, research into an LED that may be driven even by AC power by connecting a plurality of light emitting cells to each other in series or in parallel has been actively conducted.

In order to solve the problems in the related art as described above, a sequential driving scheme of LEDs using the AC power has been suggested. According to the sequential driving scheme, if it is assumed that a lighting apparatus includes three light emitting diode groups, under the situation that an input voltage is increased over time, a first light emitting diode group first starts to emit light at a first forward voltage level and a second forward voltage level higher than the first forward voltage level, a second light emitting diode group connected to the first light emitting diode group in series starts to emit light at the second forward voltage level and a third forward voltage level which is a voltage higher than the second forward voltage level, and the third light emitting diode group connected to the second light emitting diode group and the first light emitting diode group in series starts to emit light at the third forward voltage level and a fourth forward voltage level which is a voltage higher than the third forward voltage level. Meanwhile, under the situation that the input voltage is reduced over time, the third light emitting diode group first stops emitting light at the second forward voltage level and the third forward voltage level, the second light emitting diode group stops emitting light at the first forward voltage level and the second forward voltage level, and the first light emitting diode group finally stops emitting light at a voltage level which is equal to or less than the first forward voltage level, such that a driving current for the light emitting diode is designed to approximate to the input voltage.

However, the driving circuit for a light emitting diode based on the general sequential driving scheme may brings about the flicker at timing when each of the light emitting diode groups is sequentially driven. In particular, the driving circuit for the light emitting diode based on the general sequential driving scheme may bring about a flicker in a section where it is progressed from a high forward voltage level to a low forward voltage level.

SUMMARY

An object of the present invention is to provide a driving circuit and a lighting apparatus for a light emitting diode capable of improving a flicker, light efficiency, and dimming characteristics.

As described above, a characteristic configuration of present invention is as follows for achieving the above objects of the present invention and specific effects of the present invention.

According to another exemplary embodiment of the present invention, there is provided a driving circuit for a light emitting diode including: a dimmer modulating an input AC voltage depending on a selected dimming level; a rectifier full-wave rectifying the modulated AC voltage output from the dimmer to generate and output a driving voltage; and a driving module receiving the driving voltage of the rectifier to detect the selected dimming level and selecting one of three driving modes of a stop mode, a resistance driving mode, and a sequential driving mode depending on the detected dimming level, thereby improving a flicker by the resistance driving mode and improving light efficiency and electrical characteristics by the sequential driving mode.

The stop mode may correspond to a first dimming level and the first dimming level may have a dimming level which is equal to or less than 1 to 30°.

The resistance driving mode may correspond to a second dimming level and the second dimming level may have a dimming level of 31° to 90°.

The sequential driving mode may correspond to a third dimming level and the third dimming level may have a dimming level of 91° to 180°.

The driving module may include a dimming level detector detecting the dimming level, and the dimming level detector may include: first and second resistors connected to a mode terminal; a first capacitor connected between the first and second resistors in parallel; and a second capacitor connected to an internal DC power terminal.

The dimming level detector may include a resistor and a capacitor using a clock signal of the driving module to detect a signal section modulated by the dimmer.

The dimmer may be any one of a TRIAC dimmer phase-cutting a phase of AC power using a TRIAC, a pulse width modulation (PWM) dimmer, and an analog voltage dimmer changing the AC voltage.

The disclosed driving circuit for a light emitting diode includes: a dimmer modulating an AC voltage input depending on a selected dimming level; a rectifier full-wave rectifying the modulated AC voltage output from the dimmer to generate and output a driving voltage; a driving module receiving the driving voltage of the rectifier to detect the selected dimming level and controlling a driving mode of a plurality of light emitting diode groups depending on the detected dimming level; and a plurality of light emitting diode groups emitting light depending on a control of the driving module, in which the driving module selects one of a resistance driving mode driving all of the plurality of light emitting diode groups and a sequential driving mode sequentially driving the plurality of light emitting diode groups, thereby improving light efficiency and dimming characteristics.

According to still another exemplary embodiment of the present invention, there is provided a lighting apparatus for a light emitting diode including: a dimmer modulating an input AC voltage depending on a selected dimming level; a rectifier full-wave rectifying the modulated AC voltage output from the dimmer to generate and output a driving voltage; a driving module receiving the driving voltage of the rectifier to detect the selected dimming level and selecting one of three driving modes of a stop mode, a resistance driving mode, a sequential driving mode depending on the detected dimming level; and a plurality of light emitting diode groups emitting light depending on a control of the driving module, thereby improving a flicker by the resistance driving mode and improving light efficiency and electrical characteristics by the sequential driving mode.

According to yet another exemplary embodiment of the present invention, there is provided a driving circuit for a light emitting diode including: a TRIAC dimmer for a light emitting diode modulating an input AC voltage depending on a selected dimming level; a rectifier full-wave rectifying the modulated AC voltage output from the dimmer to generate and output a driving voltage; a driving module receiving the driving voltage of the rectifier to detect the selected dimming level and driving a plurality of light emitting diode groups depending on the detected dimming level; and a bleeder circuit providing a bleeder current to the TRIAC dimmer, in which the bleeder circuit detects a driving current for the light emitting diode flowing through at least one of the plurality of light emitting diode groups and controls a magnitude in the bleeder current based on the detected driving current for the light emitting diode.

The bleeder circuit may not provide the bleeder current when the detected dimming level is equal to or more than a preset threshold dimming level.

The bleeder circuit may control the magnitude in the bleeder current to maintain a sum of the driving current for the light emitting diode and the bleeder current at a preset threshold current value and the threshold current value may be equal to or more than a holding current value of the TRIAC dimmer According to still yet another exemplary embodiment of the present invention, there is provided a lighting apparatus for a light emitting diode including: a TRIAC dimmer modulating an input AC voltage depending on a selected dimming level; a rectifier full-wave rectifying the modulated AC voltage output from the dimmer to generate and output a driving voltage; a driving module receiving the driving voltage of the rectifier to detect the selected dimming level and driving a plurality of light emitting diode groups depending on the detected dimming level; the plurality of light emitting diode groups emitting light depending on a control of the driving module; and a bleeder circuit providing a bleeder current to the TRIAC dimmer, in which the bleeder circuit may detect a driving current for the light emitting diode flowing through at least one of the plurality of light emitting diode groups and controls a magnitude in the bleeder current based on the detected driving current for the light emitting diode.

The bleeder circuit may not provide the bleeder current when the detected dimming level is equal to or more than a preset threshold dimming level.

The bleeder circuit may control a magnitude in the bleeder current to maintain a sum of the driving current for the light emitting diode and the bleeder current at a preset threshold current value and the threshold current value may be equal to or more than a holding current value of the TRIAC dimmer According to further still another exemplary embodiment of the present invention, there is provided a driving circuit for a light emitting diode connected to a TRIAC dimmer modulating an input AC voltage depending on a selected dimming level, the driving circuit including: a rectifier full-wave rectifying the modulated AC voltage output from the dimmer to generate and output a driving voltage; a driving module receiving the driving voltage of the rectifier to detect the selected dimming level and driving a plurality of light emitting diode groups depending on the detected dimming level; and a bleeder circuit providing a bleeder current to the TRIAC dimmer, in which the bleeder circuit provides the bleeder current only for a preset on-duty time.

The bleeder circuit may be configured to set the on-duty time.

A current value of the bleeder current may be equal to or more than a triggering current value of the TRIAC dimmer.

A minimum current value of the driving current for the light emitting diode flowing through at least one of the plurality of light emitting diode groups may be equal to or more than a holding current value of the TRIAC dimmer.

According to further yet another exemplary embodiment of the present invention, there is provided a lighting apparatus for a light emitting diode operated by being connected to a TRIAC dimmer modulating an input AC voltage depending on a selected dimming level, the lighting apparatus including: a rectifier full-wave rectifying the modulated AC voltage output from the dimmer to generate and output a driving voltage; a driving module receiving the driving voltage of the rectifier to detect the selected dimming level and driving a plurality of light emitting diode groups depending on the detected dimming level; plurality of light emitting diode groups emitting light depending on a control of the driving module; and a bleeder circuit providing a bleeder current to the TRIAC dimmer, in which the bleeder circuit provides the bleeder current only for a preset on-duty time.

The bleeder circuit may be configured to set the on-duty time.

A current value of the bleeder current may be equal to or more than a triggering current value of the TRIAC dimmer.

A minimum current value of the driving current for the light emitting diode flowing through at least one of the plurality of light emitting diode groups may be equal to or more than a holding current value of the TRIAC dimmer.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
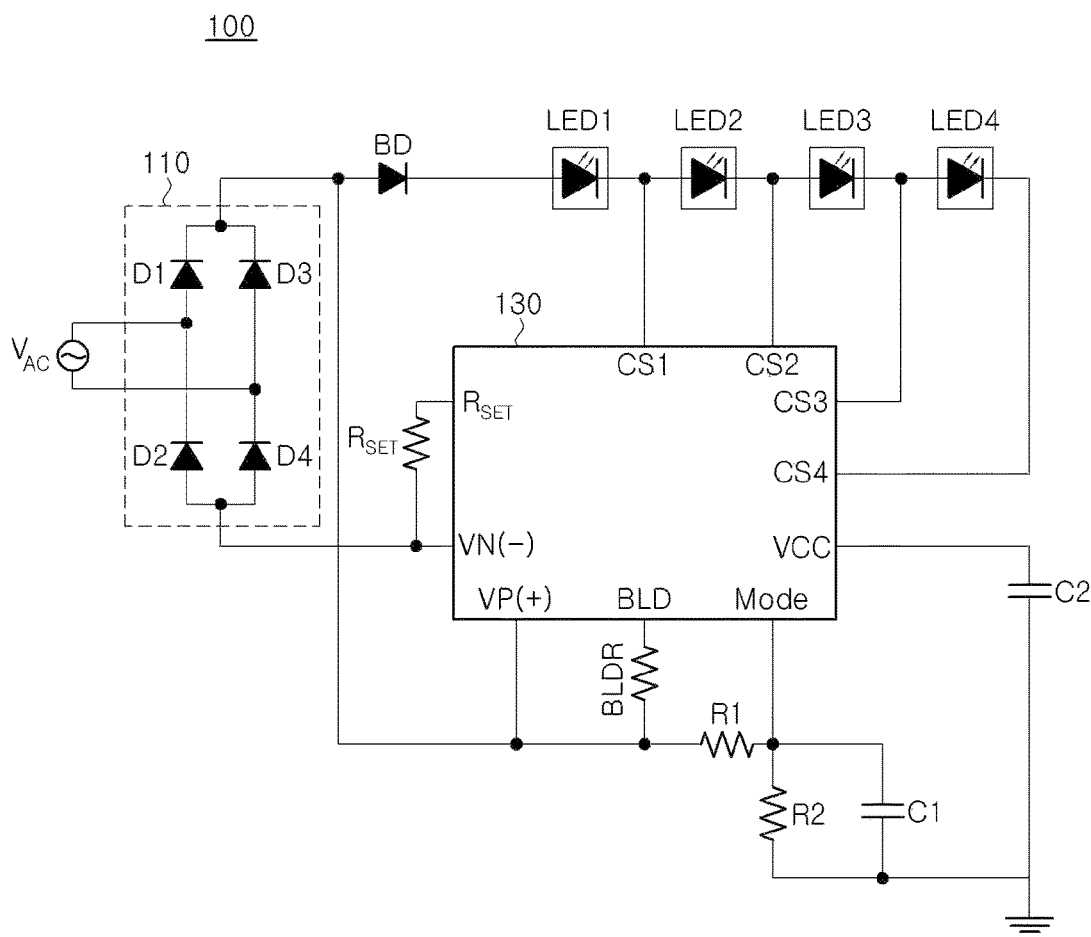
FIG. 1 is a diagram illustrating a lighting apparatus for a light emitting diode including a driving circuit for a light emitting diode and first to fourth light emitting diode groups according to an exemplary embodiment of the present invention.

Exemplary embodiments of the present invention will be described in detail with reference to the accompanying drawings. These exemplary embodiments will be described in detail for those skilled in the art in order to practice the present invention. It should be appreciated that various exemplary embodiments of the present invention are different from each other, but do not have to be exclusive. For example, specific shapes, structures, and characteristics described in the present specification may be implemented in another exemplary embodiment without departing from the spirit and the scope of the present invention in connection with an exemplary embodiment. In addition, it should be understood that a position or an arrangement of individual components in each disclosed exemplary embodiment may be changed without departing from the spirit and the scope of the present invention. Therefore, a detailed description to be described below should not be construed as being restrictive. In addition, the scope of the present invention is defined only by the accompanying claims and their equivalents if appropriate. Similar reference numerals will be used to describe the same or similar functions throughout the accompanying drawings.

Hereinafter, in order for a person having ordinary skill in the art to which the present invention pertains to easily practice the present invention, the exemplary embodiments of the present invention will be described in detail with reference to the accompanying drawings.

In an exemplary embodiment of the present invention, a term 'light emitting diode (LED) group' means a set of LEDs in which a plurality of LEDs (or a plurality of light emitting cells) are connected in series, in parallel, or in series and parallel, such that operations of the plurality of LEDs are controlled in one unit depending on a control of an LED driving module (that is, the plurality of LEDs are turned on/off together with each other).

Further, a term 'first forward voltage level (Vf1)' means a threshold voltage level that may drive one LED group, a term 'second forward voltage level (Vf2)' means a threshold voltage level that may drive two LED groups connected in series, and a term 'third forward voltage level (Vf3)' means a threshold voltage level that may drive three LED groups connected with one another in series. That is, an 'n-th forward voltage level (Vfn)' means a threshold voltage level that may drive n LED groups connected with one another in series. Meanwhile, forward voltage levels of each LED group may be the same as each other or different from each other depending on the number/characteristics of LEDs configuring the LED group.

FIG. 1 is a diagram illustrating a lighting apparatus for a light emitting diode including a driving circuit for a light emitting diode and first to fourth light emitting diode groups according to an exemplary embodiment of the present invention.

As illustrated in FIG. 1, a lighting apparatus 100 for a light emitting diode includes a driving circuit for a light emitting diode and first to fourth light emitting diode groups LED1 to LED4, in which the driving circuit for a light emitting diode may be configured to include a rectifier 110 and a driving module 130.

The rectifier 110 rectifies an AC voltage of which the phase is modulated to generate a driving voltage and outputs the generated driving voltage. The rectifier 110 is not particularly limited and may use one of various known rectifier circuits such as a full-wave rectifier circuit, a half-wave rectifier circuit, and the like. For example, the rectifier 110 may be a bridge full-wave rectifier circuit configured of four diodes D1 to D4.

The first to fourth light emitting diode groups LED1 to LED4 include a plurality of light emitting diodes in which at least two light emitting diodes are connected in series or in parallel. The exemplary embodiment of the present invention describes only the first to fourth light emitting diode groups LED1 to LED4 but is not limited thereto. Therefore, the number of light emitting diode groups may be variously changed.

The first to fourth light emitting diode groups LED1 to LED4 may be driven together in a resistance driving mode which is driven at a predetermined driving current by control signals from switching terminals CS1 to CS4 of the driving module 130 or may be driven in a sequential driving mode.

Although not illustrated in the drawings, the driving circuit for a light emitting diode may further include a dimmer (not illustrated).

The dimmer receives an AC voltage $V_{AC}$ from an AC voltage source and generates and outputs AC power in which the received AC voltage $V_{AC}$ is modulated into a dimming level selected by a user's manipulation. The dimmer may be one of a TRIAC dimmer phase-cutting a phase of the AC power using a TRIAC, a pulse width modulation (PWM) dimmer, an analog voltage dimmer changing the AC voltage, and dimmers equivalent thereto. That is, the dimmer generates/outputs an AC voltage by modulating the AC voltage depending on the selected dimming level. Any dimmer capable of detecting the dimming level selected by a dimming level detector to be described below from the AC voltage modulated by the dimmer may be used. Although the present invention will describe a TRIAC dimmer as one embodiment of the dimmer, it will be obvious that the scope of the present invention is not limited thereto but also includes embodiments in which one of various dimmers as described above is used as long as it includes the gist of the present invention.

The driving circuit for a light emitting diode may include a bleeder circuit including a bleeder resistor (BLDR) for stably driving the dimmer.

The driving circuit for a light emitting diode further includes the dimming level detector detecting the dimming level. The dimming level detector may include first and second resistors R1 and R2 connected to a mode terminal, a first capacitor C1 connected between the first and second resistors R1 and R2 in parallel, and a second capacitor C2 connected to an internal DC power terminal $V_{CC}$.

Figure 9:
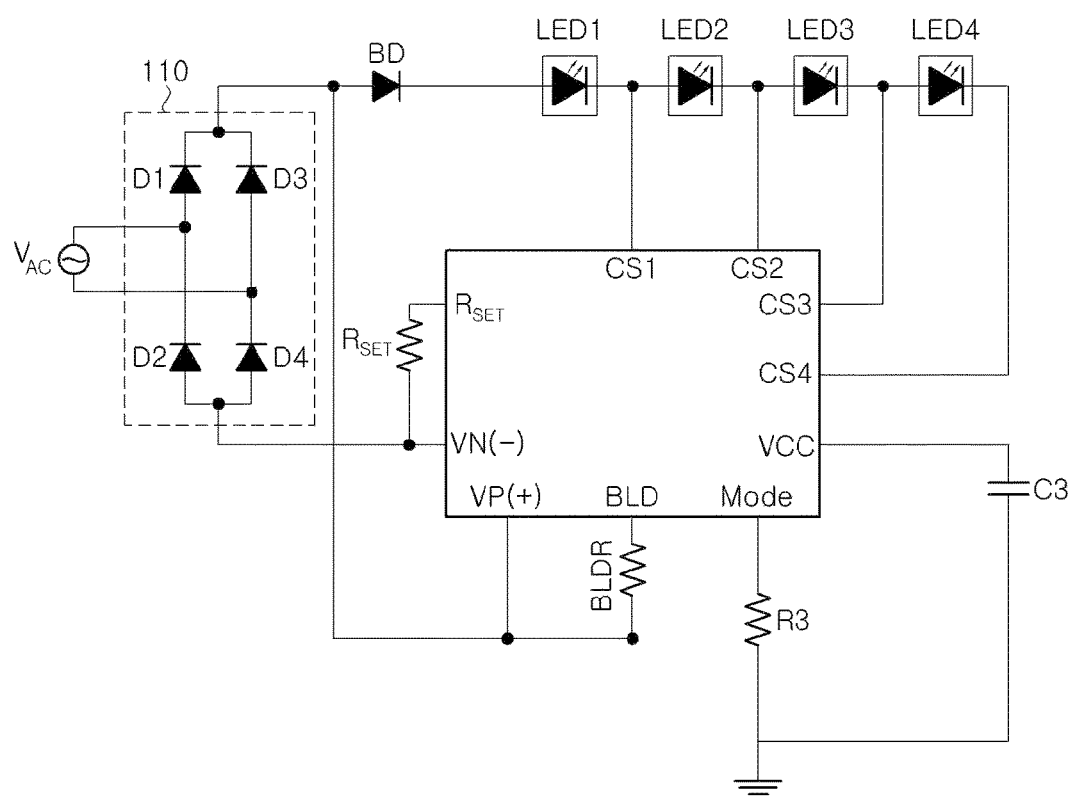
FIG. 9 is a diagram illustrating a lighting apparatus for a light emitting diode including a driving circuit for a light emitting diode and first to fourth light emitting diode groups according to another exemplary embodiment of the present invention.

The exemplary embodiment of the present invention describes that the dimming level detector includes only the first resistor R1, the second resistor R2, the first capacitor C1, and the second capacitor C2 but is not limited thereto. Therefore, as illustrated in FIG. 9, the dimming level detector may also be configured to include a resistor R3 and a capacitor C3 for detecting a modulated signal section of the dimmer using the internal clock signal of the driving module 130.

The dimming level detector detects a voltage of the second resistor R2 and the second capacitor C2 using the first resistor R1, the second resistor R2, and the first capacitor C1.

The dimming level detected from the dimming level detector may be a DC signal having a constant voltage value corresponding to the dimming level in the driving module 130. For example, when the dimming level is 80°, the voltage may be 1.8V, when the dimming level is 20°, the voltage may be 0.2V, and when the dimming level is 50°, the voltage may be 1.0V.

The driving module 130 selects one of a stop mode, a resistance driving mode, and a sequential driving mode depending on the dimming level detected by the dimming level detector.

The stop mode is a section where the driving of the first to fourth light emitting diode groups LED1 to LED4 stops, which may be a first dimming level. For example, the first dimming level is not particularly limited but may be 1 to 30°.

In the resistance driving mode, all the first to fourth light emitting diode groups LED1 to LED4 are driven and the resistance driving mode may be a second dimming level. For example, the second dimming level is not particularly limited but may be 31 to 90°.

In the sequential driving mode, the first to fourth light emitting diode groups LED1 to LED4 are sequentially driven depending on the level of the input driving voltage. The sequential driving mode may be a third dimming level. For example, the third dimming level is not particularly limited but may be 91° to 180°. In detail, the sequential driving mode sequentially drives first light emitting diode groups LED1-1 to LED1-4 in response to the third dimming level. According to the present invention, four stage driving will be described as an example. The 4-stage driving is divided into first to seventh sections, and the first section is a section in which a level of the driving voltage input from the rectifier 110 is between a first forward voltage level Vf1 and a second forward voltage level Vf2 and the first light emitting diode group LED1 emits light by a first switch terminal CS1. Further, the second section is a section in which the level of the driving voltage input from the rectifier 110 is between the second forward voltage level Vf2 and a third forward voltage level Vf3 and the first and second light emitting diode groups LED1 and LED2 are connected to a second switch terminal CS2 to emit light. Further, the third section is a section in which the level of the driving voltage input from the rectifier 110 is between the third forward voltage level Vf3 and a fourth forward voltage level Vf4 and the first to third light emitting diode groups LED1 to LED3 are connected to a third switch terminal CS3 to emit light. Further, the fourth section is a section in which the level of the driving voltage input from the rectifier 110 is equal to or more than a fourth forward voltage level Vf4 and the first to fourth light emitting diode groups LED1 to LED4 are connected to a fourth switch terminal CS4 to emit light. Further, the fifth section is a section in which the level of the driving voltage input from the rectifier 110 is between the third forward voltage level Vf3 and a fourth forward voltage level Vf4 and the first to third light emitting diode groups LED1 to LED3 are connected to a third switch terminal CS3 to emit light. Further, the sixth section is a section in which the level of the driving voltage input from the rectifier 110 is between the second forward voltage level Vf2 and a third forward voltage level Vf3 and the first and second light emitting diode groups LED1 and LED2 are connected to a second switch terminal CS2 to emit light. Further, the seventh section is a section in which the level of the driving voltage input from the rectifier 110 is between the first forward voltage level Vf1 and the second forward voltage level Vf2 and the first light emitting diode group LED1 emits light by a first switch terminal CS1.

The first and seventh sections may be defined as a first stage driving section, the second and sixth sections may be defined as a second stage driving section, the third and fifth sections may be defined as a third stage driving section, and the fourth section may be defined as a fourth stage driving section. The first light emitting diode groups LED1 to LED4 may each have different forward voltage levels. For example, when the first light emitting diode groups LED1 to LED4 each include different number of light emitting diodes, they have different forward voltage levels.

Figure 2:
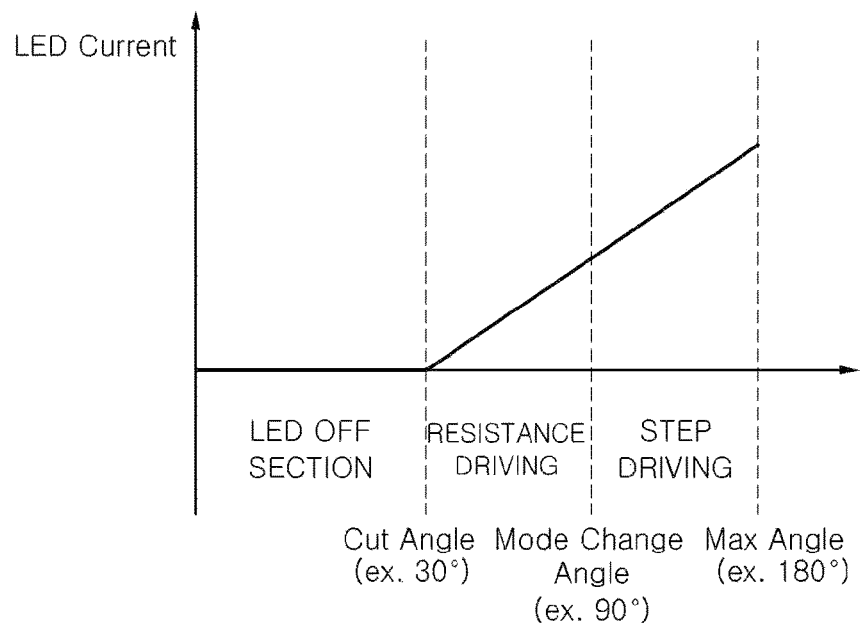
FIG. 2 is a graph illustrating a plurality of driving modes depending on dimming levels.
Figure 3:
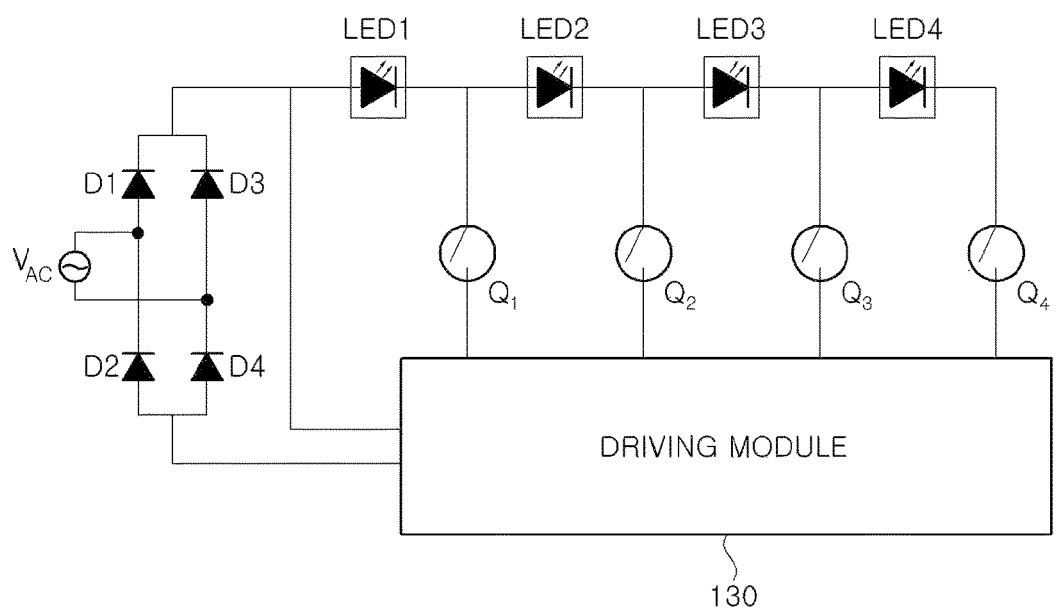
FIG. 3, FIG. 4, and FIG. 5 are diagrams illustrating a driving of switching devices depending on the plurality of driving modes.
Figure 4:
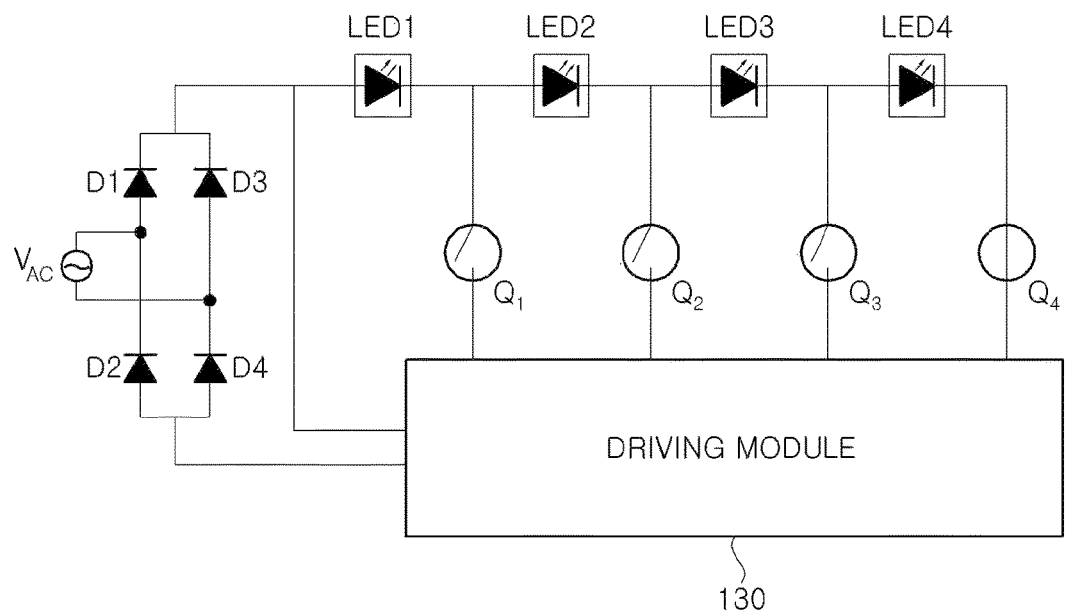
Figure 5:
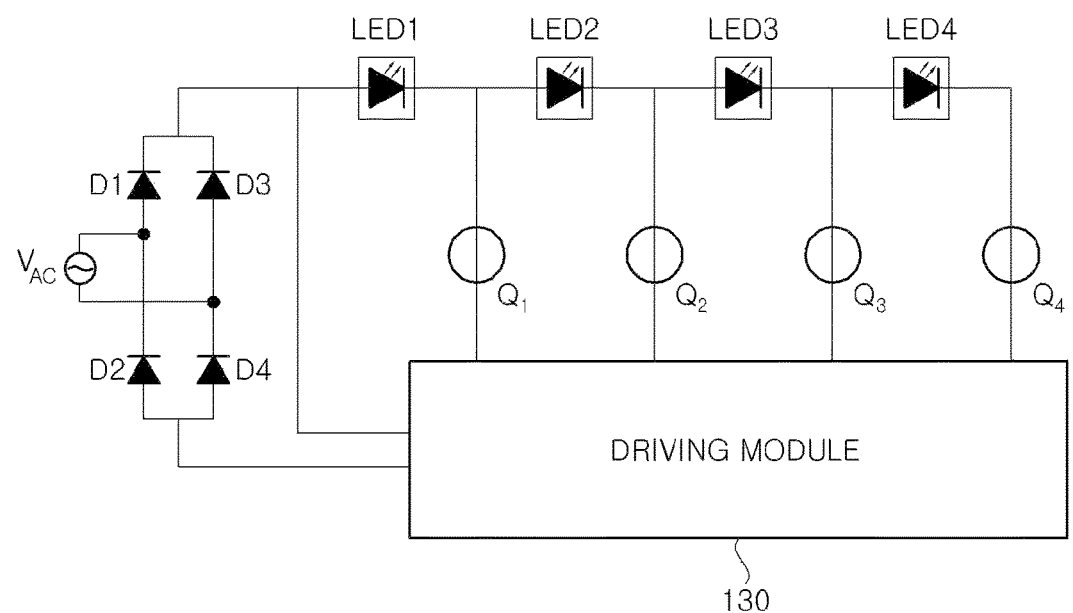
Figure 6:
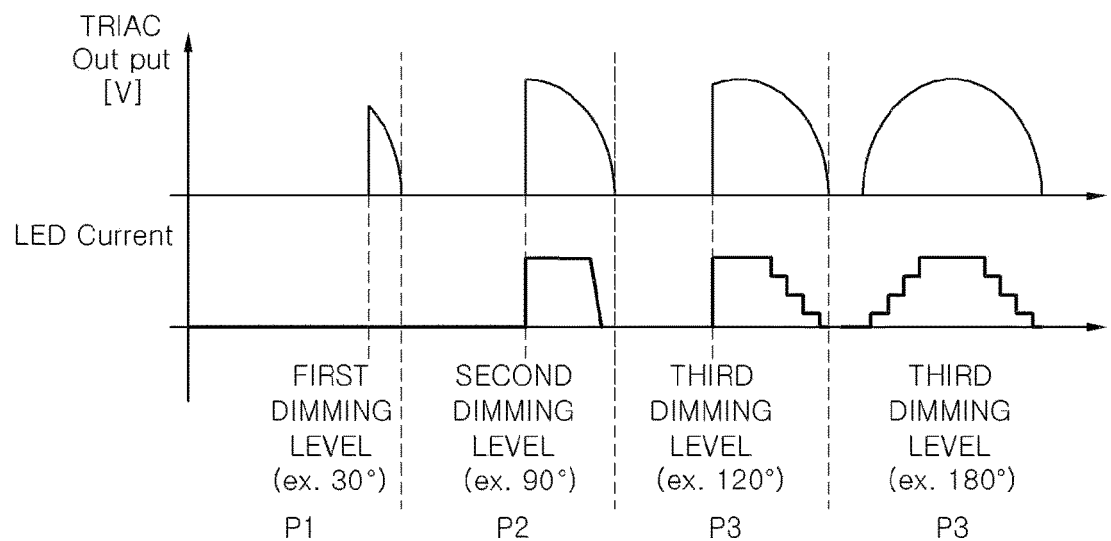
FIG. 6 is a graph illustrating a driving current for the plurality of light emitting diode groups depending on the plurality of driving modes.

FIG. 2 is a graph illustrating a plurality of driving modes depending on dimming levels, FIGS. 3 to 5 are diagrams illustrating a driving of switching devices depending on the plurality of driving modes, and FIG. 6 is a graph illustrating a driving current for the plurality of light emitting diode groups depending on the plurality of driving modes.

As illustrated in FIGS. 2 to 6, the driving mode may be divided into the stop mode, the resistance driving mode, and the sequential driving mode depending on the dimming level of the driving voltage modulated by the dimmer. FIG. 2 illustrates an effective value of the driving current for a light emitting diode depending on the dimming level.

In the stop mode, referring to FIG. 3, first to fourth switching devices $Q_1$ to $Q_4$ controlling the first to fourth light emitting diode groups LED1 to LED4 are turned off.

Therefore, the stop mode is a section in which the driving of the first to fourth light emitting diode groups LED1 to LED4 stop. For example, the stop mode is not particularly limited but the dimming level may be 1 to 30°.

In the resistance driving mode, referring to FIG. 4, the fourth switching device $Q_4$ of the first to fourth switching devices $Q_1$ to $Q_4$ controlling the first to fourth light emitting diode groups LED1 to LED4 is turned on and the first to third switching devices $Q_1$ to $Q_3$ are turned off.

Therefore, the resistance driving mode is a section in which the first to fourth light emitting diode groups LED1 to LED4 are connected in series and thus all of them are driven. For example, the resistance driving mode is not particularly limited but the dimming level may be 31 to 90°.

In the sequential driving mode, referring to FIG. 5, first to fourth switching devices $Q_1$ to $Q_4$ controlling the first to fourth light emitting diode groups LED1 to LED4 are sequentially driven depending on the level of the input driving voltage. That is, the first to fourth switching devices $Q_1$ to $Q_4$ may be sequentially turned on.

Therefore, the sequential driving mode is a section in which the first to fourth light emitting diode groups LED1 to LED4 are sequentially driven. For example, the sequential driving mode is not particularly limited but the dimming level may be 91 to 180°.

Referring to FIG. 6, the driving circuit for a light emitting diode according to the exemplary embodiment of the present invention detects the AC voltage modulated by the dimmer to apply different driving modes depending on the first to third dimming levels P1 to P3 so as to drive all the first to fourth switching devices $Q_1$ to $Q_4$ in the section in which the flicker occurs due to the resistance driving mode, thereby improving the flicker and sequentially drive the first to fourth switching devices $Q_1$ to $Q_4$ in the section in which the flicker does not occur due to the sequential driving mode, thereby improving the light efficiency and the electrical characteristics while improving the flicker.

Figure 7:
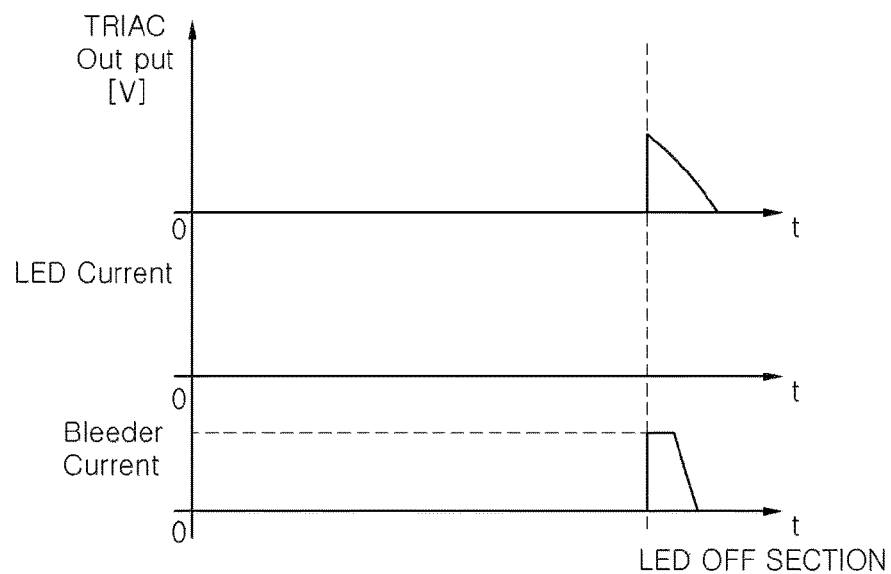
FIG. 7 is a diagram illustrating a bleeder current driving a dimmer in a stop mode of the present invention.

FIG. 7 is a diagram illustrating the bleeder current driving the dimmer in the stop mode of the present invention.

As illustrated in FIG. 7, the driving circuit for a light emitting diode of the present invention provides the bleeder current to the dimmer in the section of the stop mode in which the driving of the first to fourth light emitting diode groups stops, thereby preventing the malfunction of the dimmer.

Figure 8:
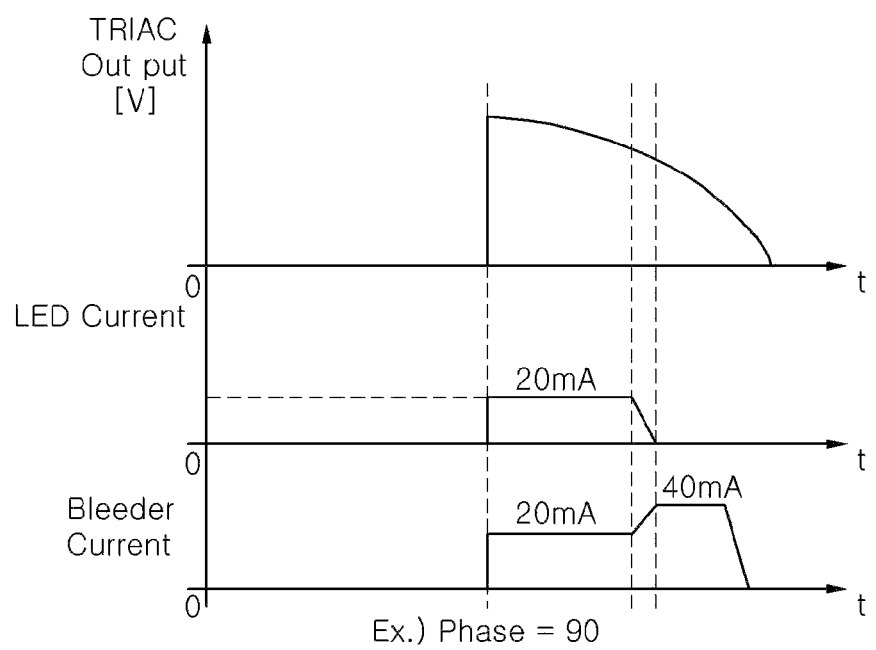
FIG. 8 is a diagram illustrating the driving current and the bleeder current for the light emitting diode in the resistance driving mode of the present invention.

FIG. 8 is a diagram illustrating the driving current and the bleeder current for the light emitting diode in the resistance driving mode of the present invention.

As illustrated in FIG. 8, the driving circuit for a light emitting diode of the present invention detects the driving current for the first to fourth light emitting diode groups in the section of the resistance driving mode in which all the first to fourth light emitting diode groups are driven and dynamically controls the magnitude in the bleeder current depending on the magnitude in the detected driving current for the light emitting diode to provide the bleeder current to the dimmer. The description thereof will be described below in more detail with reference to FIGS. 10 to 11B. Further, as illustrated in FIG. 8, the driving circuit for a light emitting diode according to the present invention may be configured to control the driving current for the light emitting diode to be a constant current of 20 mA in the section of the resistance driving mode. Meanwhile, even if the driving current for the light emitting diode is controlled to be a constant current, if the dimming level is reduced, the time when the light emitting diode group emits light is automatically reduced, such that the effective value of the driving current for the light emitting diode may be increased and decreased in response to the dimming level as illustrated in FIG. 2.

Figure 10:
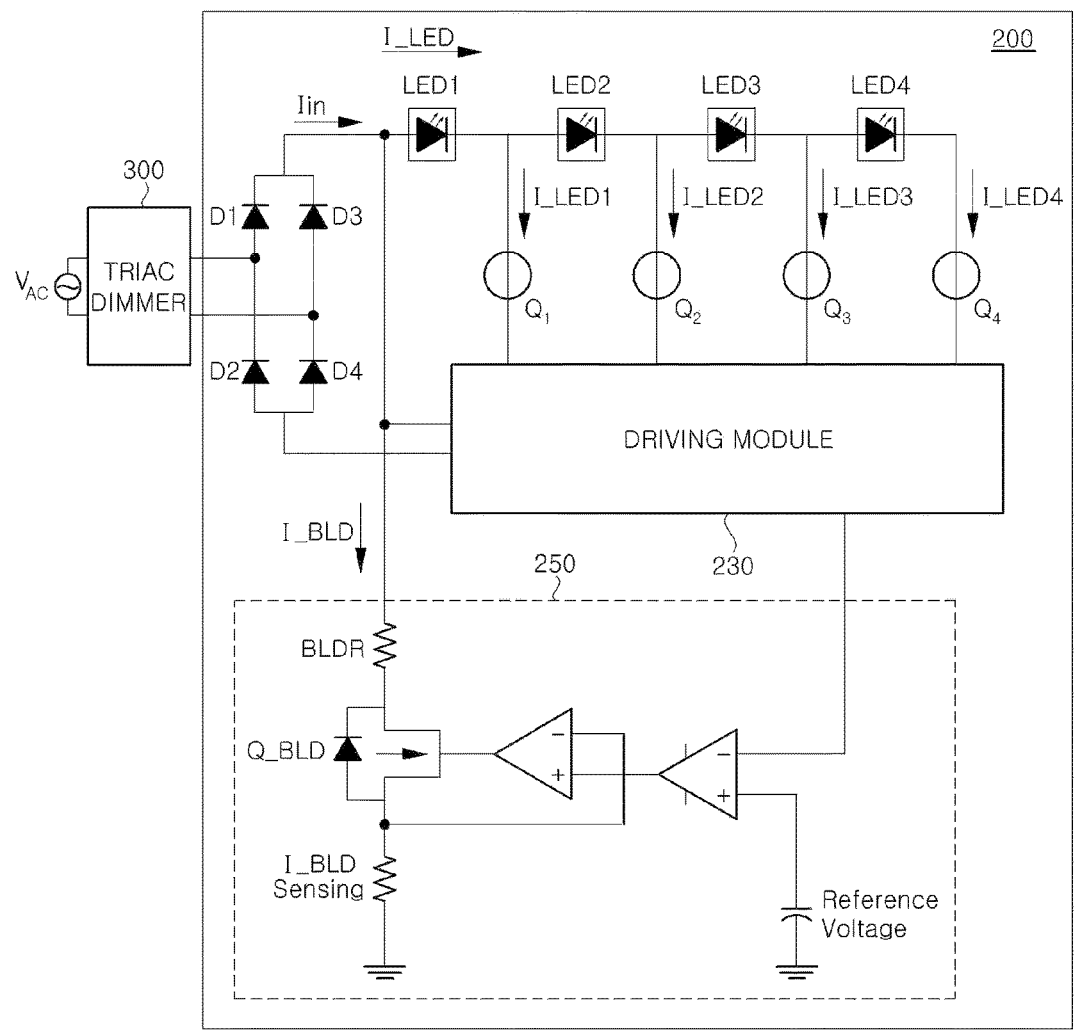
FIG. 10 is a diagram illustrating a lighting apparatus for a light emitting diode including a driving circuit for a light emitting diode and first to fourth light emitting diode groups according to another exemplary embodiment of the present invention.
Figure 11A:
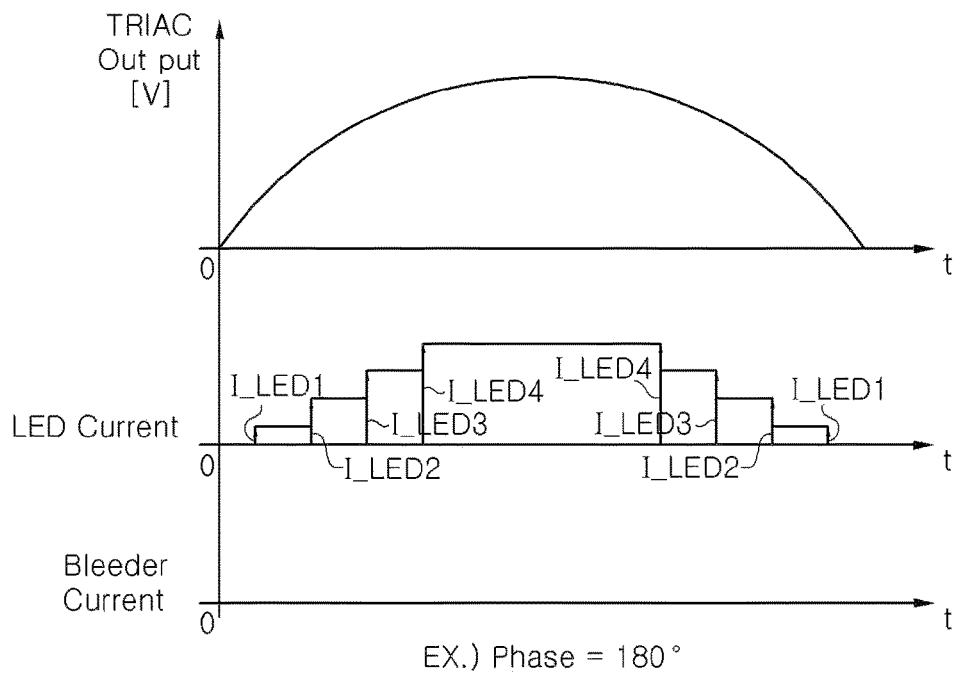
FIGS. 11A and 11B are diagrams illustrating a driving current and a bleeder current for a light emitting diode depending on a dimming level of the lighting apparatus for a light emitting diode illustrated in FIG. 10.
Figure 11B:
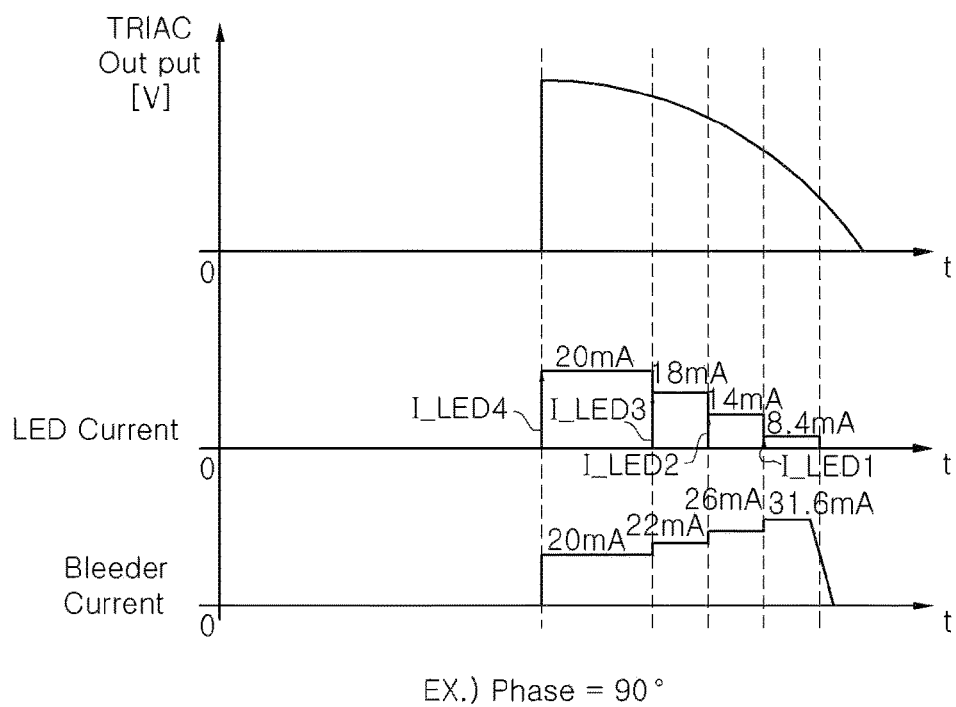

FIG. 10 is a diagram illustrating a lighting apparatus 200 for a light emitting diode including a driving circuit for a light emitting diode and first to fourth light emitting diode groups according to still another exemplary embodiment of the present invention and FIGS. 11A and 11B are diagrams illustrating the driving current and the bleeder current for a light emitting diode depending on the dimming level of the lighting apparatus for a light emitting diode illustrated in FIG. 10. Hereinafter, the driving circuit for a light emitting diode according to still another exemplary embodiment of the present invention will be described in detail with reference to FIGS. 10, 11A, and 11B.

The driving circuit for a light emitting diode described with reference to FIGS. 10 to 11B is a driving circuit configured to be operated together with a TRIAC dimmer 300 and is configured to determine whether to dynamically provide the bleeder current depending on the dimming level or the magnitude in the driving current for the light emitting diode and control the magnitude in the bleeder current. Other functions of a driving module 230 are the same as those of the driving module 130 according to the exemplary embodiment described above and therefore the overlapping contents thereof cite the above description and therefore technical features differentiated from the above exemplary embodiments will be intensively described.

First, as illustrated in FIG. 10, the lighting apparatus 200 for a light emitting diode according to another exemplary embodiment of the present invention includes the driving circuit for a light emitting diode and the first to fourth light emitting diode groups LED1 to LED4, in which the driving circuit for a light emitting diode may be configured to include the rectifier 110, the driving module 230, and a bleeder circuit 250.

The driving module 230 according to the present invention is configured to detect the dimming level like the foregoing driving module 130 and drive the first to fourth light emitting diode groups LED1 to LED4 in one of the stop mode, the resistance driving mode, and the sequential driving mode depending on the detected dimming level.

Further, more preferably, in the case of the sequential driving mode, the driving module 230 according to the present invention may be configured to control the magnitude in the driving current for the light emitting diode to be different for each driving section so that the driving current for the light emitting diode approximates the waveform of the input voltage. That is, the driving module 230 may control the magnitude in the driving current for the light emitting diode to sequentially increase a driving current I_LED1 for the first light emitting diode flowing through the first light emitting diode group LED1 in a first stage driving section to a driving current I_LED4 for the fourth light emitting diode flowing through the first light emitting diode group LED1 to the fourth light emitting diode group LED4 in a fourth stage driving section in response to the increase in the driving section. In other words, the driving module 230 is configured to control the driving current for light emitting diodes of each driving section to be constant current as driving current values for light emitting diodes in each preset driving section so that the relationship of 'driving current I_LED1 for first light emitting diode<driving current I_LED2 for second light emitting diode<driving current I_LED3 for third light emitting diode<driving current I_LED4 for fourth light emitting diode' is established. The relationship is illustrated in FIGS. 11A and 11B. To perform the function, the first to fourth switching devices Q1 to Q4 may be configured to control a value of the driving current I_LED for the light emitting diode flowing through each switch depending on the control of the driving module 230 to be constant current as a preset value. Further, the first switching device Q1 to the fourth switching device Q4 may be implemented using various known technologies. For example, each of the first switching device Q1 to the fourth switching device Q4 according to the present invention may further include a sensing resistor for current detection and a differential amplifier for comparing a reference current value with a currently detected current value and may be configured to control a connection of paths depending on the output of the differential amplifier and control the driving current values for the light emitting diode flowing through the paths to be constant current as the preset current value. Further, the switching device configuring a constant current switch may be implemented as one of various known electronic switching devices such as bipolar junction transistor (BJT) and field effect transistor (FET).

Further, more preferably, the driving module 230 according to the present invention may be configured to control the magnitude in the driving current for the light emitting diode according to the selected dimming level. As known, since the light output from the light emitting diode is in proportion to the magnitude in the driving current for the light emitting diode in the characteristics of the light emitting diode, the driving module 230 according to the present invention may be configured to increase and decrease the magnitude in the driving current I_LED for the light emitting diode in response to the increase and decrease in the dimming level to more efficiently perform the dimming control.

Meanwhile, in the case of using the TRIAC dimmer 300, after the TRIAC is turned on by a trigger current in the characteristics of the TRIAC device, the holding current which is a minimum current for holding the turned-on state needs to be supplied to the TRIAC. As described above, the lighting apparatus 200 for a light emitting diode according to the present invention may include the bleeder circuit 250 for stably holding the holding current. When viewed from the TRIAC dimmer side, an input current Iin flowing into the lighting apparatus 200 for the light emitting diode through the TRIAC dimmer 300 may be represented by 'driving current I_LED for light emitting diode+bleeder current I_BLD', and therefore the input current Iin needs to be equal to or more than the holding current of the TRIAC dimmer 300, thereby preventing the malfunction of the TRIAC dimmer 300. On the other hand, as described above, the lighting apparatus 200 for a light emitting diode according to the present invention is configured so that the magnitude in the driving current I_LED for the light emitting diode is changed depending on each driving mode (stop mode, resistance driving mode, and sequential driving mode) and/or each driving section (first stage driving section, second stage driving section, third stage driving section, fourth stage driving section), and/or each dimming level. Therefore, even when the magnitude in the driving current I_LED for the light emitting diode is changed, the solution for stably operating the TRIAC dimmer 300 is required.

To provide the above functions, the driving circuit according to the present invention may include the bleeder circuit 250. The bleeder circuit 250 according to the present invention may be configured to detect the currently flowing driving current I_LED for the light emitting diode to maintain the input current Iin as the preset threshold current value and dynamically control the magnitude in the bleeder current I_BLD depending on the detected driving current I_LED for the light emitting diode and provide the controlled bleeder current I_BLD. Here, the above-mentioned threshold current value may be set to be a predetermined value which is equal to or more than the holding current of the TRIAC dimmer 300, for example, may be set to be 20 mA, 40 mA, 60 mA, or the like, depending on the characteristics of the TRIAC dimmer 300. FIGS. 8 and 11B illustrate the exemplary embodiment in which the threshold value is set to be 40 mA and it is apparent to those skilled in the art that various threshold values may be designed and used depending on the characteristics of the TRIAC dimmer 300.

In more detail, as illustrated in FIG. 10, to perform the above-mentioned functions, the bleeder circuit 250 according to the present invention may include a bleeder resistor BLDR, a bleeder current control switching device Q_BLD, a bleeder current sensing resistor I_BLD sensing, a first comparator $Com_{\_1}$, a second comparator $Com_{\_2}$, and a reference voltage.

As illustrated in FIG. 10, an inversion input terminal of the second comparator Com_2 is connected to the driving module 230 to receive the sensing value (voltage value corresponding to the current value of the sensed driving current I_LED for the light emitting diode) of the driving current I_LED for the light emitting diode output from the driving module 230 and an non-inversion input terminal of the second comparator Com_2 is connected to the reference voltage to receive a reference voltage value. The second comparator Com_2 is configured to compare the input sensing value of the driving current I_LED for the light emitting diode with the reference voltage value and output the compared result to the non-inversion input terminal of the first comparator Com_1.

Further, as illustrated in FIG. 10, an inversion input terminal of the first comparator Com_1 is connected to the bleeder current sensing resistor (I_BLD sensing) to receive the voltage value (corresponding to the sensed bleeder current value) applied to the bleeder current sensing resistor, such that the first comparator Com_1 is configured to compare the output value of the second comparator Com_2 with the sensed bleeder current value and output the compared results to a gate terminal of the bleeder current control switching device Q_BLD.

As a result, the bleeder current control switching device Q_BLD is configured to control the magnitude in the bleeder current I_BLD depending on the signal input from the first comparator Com_1. Therefore, by the configurations of the bleeder circuit 250 as described above, the bleeder circuit 250 according to the present invention serves to detect the current value of the driving current I_LED for the light emitting diode and control the magnitude in the bleeder current I_BLD to maintain the input current Iin to be the preset threshold current value based on the current value of the detected driving current I_LED for the light emitting diode and provide the controlled magnitude in the bleeder current I_BLD to the TRIAC dimmer 300.

Meanwhile, the bleeder circuit 250 according to another exemplary embodiment of the present invention may be configured not to provide the bleeder current I_BLD when the detected dimming level is equal to or more than the preset threshold dimming level (for example, 91° or more). According to the exemplary embodiment in which the current value of the driving current I_LED for the light emitting diode is controlled depending on the dimming level, since the minimum value of the driving current I_LED for the light emitting diode at the threshold dimming level or more is enough to stably drive the TRIAC dimmer 300, the bleeder circuit 250 is configured to prevent the bleeder current I_BLD from flowing to improve the power efficiency.

Further, although FIG. 10 is that the bleeder circuit 250 is illustrated and described as the separate component from the driving module 230, it will be apparent to those skilled in the art that according to the configuration of the exemplary embodiment, the bleeder circuit 250 may be included in the driving module 230.

FIG. 11A illustrates waveforms of the output voltage of the TRIAC dimmer 300 and the driving current I_LED and the bleeder current I_BLD for the light emitting diode, when the dimming level is 180°, that is, the dimming level is 100%. Further, FIG. 11A illustrates the exemplary embodiment configured not to provide the bleeder current I_BLD when the dimming level is equal to or more than 91°. As illustrated in FIG. 11A, since the dimming level is 180°, the bleeder circuit 250 does not provide the bleeder current I_BLD. Further, since the dimming level is 180°, the lighting apparatus for a light emitting diode according to the present invention is operated in the sequential driving mode, such that the driving current I_LED for the light emitting diode is constant-current-controlled as the preset value for each driving section. That is, the driving current I_LED for the light emitting diode in the first stage driving section is constant-current-controlled as the set value of the driving current I_LED1 for the first light emitting diode, the driving current I_LED for the light emitting diode in the second stage driving section is constant-current-controlled as the set value of the driving current I_LED2 for the second light emitting diode, the driving current I_LED for the light emitting diode in the third stage driving section is constant-current-controlled as the set value of the driving current I_LED3 for the third light emitting diode, and the driving current I_LED for the light emitting diode in the fourth stage driving section is constant-current-controlled as the set value of the driving current I_LED2 for the second light emitting diode.

FIG. 11B illustrates waveforms of the output voltage of the TRIAC dimmer 300 and the driving current I_LED and the bleeder current I_BLD for the light emitting diode, when the dimming level is 90°. FIG. 11B illustrates that when the dimming level is equal to or more than 90°, the exemplary embodiment is operated in the sequential driving mode and when the dimming level is equal to or more than 91°, the exemplary embodiment is configured not to provide the bleeder current I_BLD. According to the exemplary embodiment, as illustrated in FIG. 11B, since the dimming level is 90°, the lighting apparatus for a light emitting diode is operated in the sequential driving mode and the bleeder circuit 250 supplies the bleeder current I_BLD. Further, in this case, as described above, in the state in which the threshold voltage value is set to be 40 mA and the dimming level is 90°, the driving current I_LED4 for the fourth light emitting diode is constant-current-controlled as 20 mA, the driving current I_LED3 for the third light emitting diode is constant-current-controlled as 18 mA, and the driving current I_LED2 for the second light emitting diode is constant-current-controlled as 14 mA, and the driving current I_LED1 for the first light emitting diode is constant-current-controlled as 8.4 mA. Therefore, since the bleeder circuit 250 according to the present invention is configured to detect the driving current I_LED for the light emitting diode and control the magnitude in the bleeder current I_BLD to maintain the preset threshold current value of 40 mA, as illustrated in FIG. 11B, the bleeder current I_BLD of 20 mA is provided in the fourth driving section, the bleeder current I_BLD of 22 mA is provided in the third driving section, the bleeder current I_BLD of 26 mA is provided in the second driving section, and the bleeder current I_BLD of 31.6 mA is provided in the first driving section. Therefore, by the above configuration, it is possible to stably maintain the operation state of the TRIAC dimmer 300 and maximize the power efficiency.

Figure 12A:
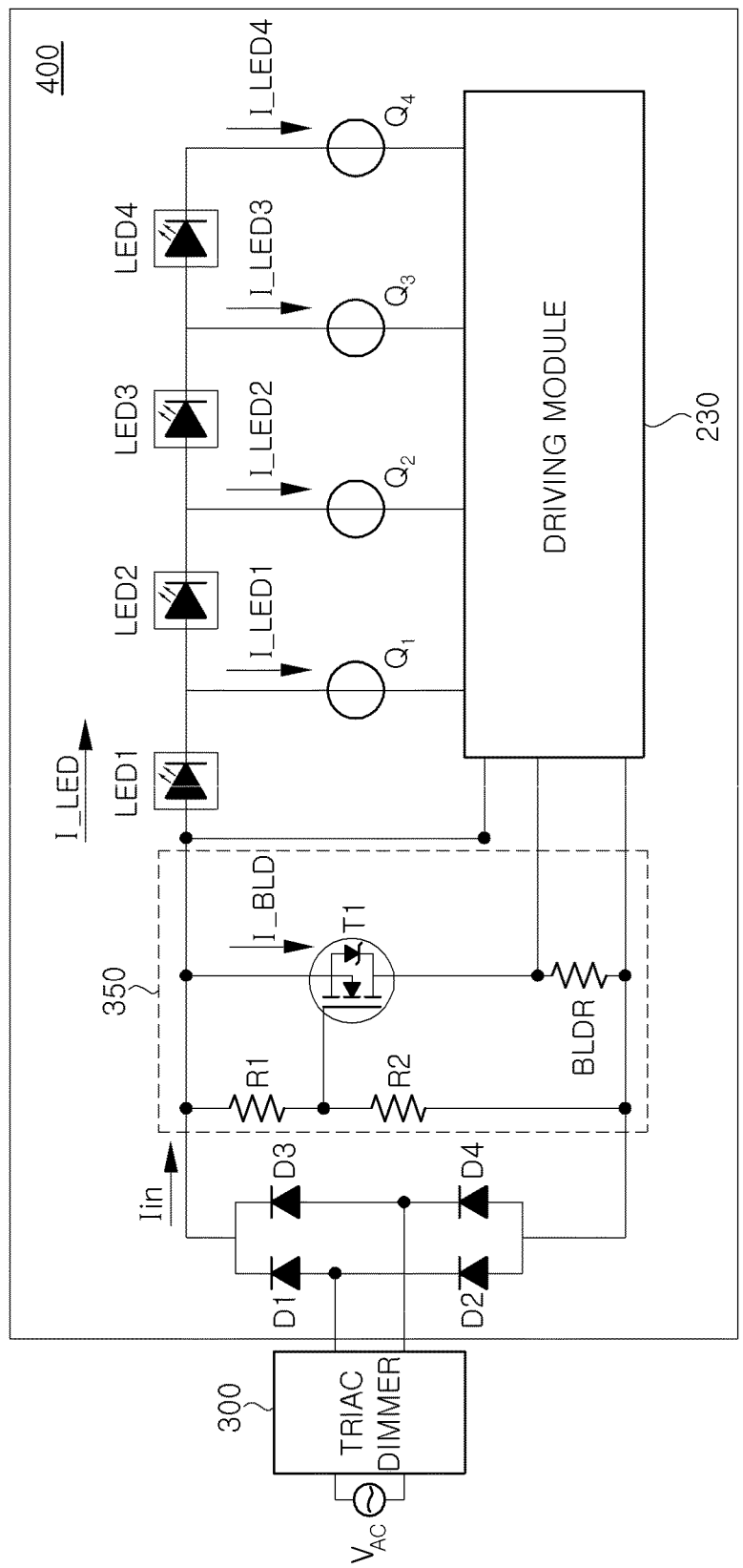
FIG. 12A is a diagram illustrating a driving circuit for a light emitting diode including a bleeder circuit and a lighting apparatus for a light emitting diode according to another exemplary embodiment of the present invention.
Figure 12B:
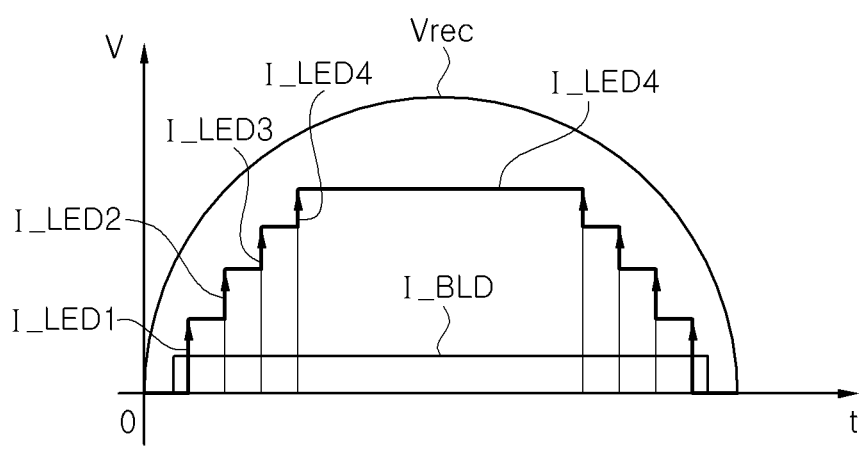
FIG. 12B is a diagram illustrating a bleeder current and a driving current for a light emitting diode which flow through the lighting apparatus for a light emitting diode illustrated in FIG. 12A.

FIG. 12A is a diagram illustrating a driving circuit for a light emitting diode including a bleeder circuit and a lighting apparatus for a light emitting diode according to another exemplary embodiment of the present invention and FIG. 12B is a diagram illustrating a bleeder current and a driving current for a light emitting diode which flow through the lighting apparatus for a light emitting diode illustrated in FIG. 12A. Hereinafter, the bleeder circuit and the driving circuit for a light emitting diode according to another exemplary embodiment of the present invention will be described with reference to FIGS. 12A and 12B.

First, as illustrated in FIG. 12A, the lighting apparatus 400 for a light emitting diode according to another exemplary embodiment of the present invention may include the driving circuit for a light emitting diode and the first to fourth light emitting diode groups LED1 to LED4, in which the driving circuit for a light emitting diode may be configured to include the rectifier 110, the driving module 230, and a bleeder circuit 350. In FIG. 12A, the rest components other than the bleeder circuit 350 may be substantially the same as the exemplary embodiments described with reference to FIGS. 10 to 11B. Therefore, the overlapping components will cite the description of FIGS. 10 to 11B. Hereinafter, the bleeder circuit 350 of FIG. 12A will be described mainly.

The bleeder circuit 350 according to another exemplary embodiment of the present invention as illustrated in FIG. 12A may be configured to more precisely control the supply of the bleeder current I_BLD. As illustrated in FIG. 12A the bleeder circuit 350 according to another exemplary embodiment of the present invention may include a first resistor R1, a second resistor R2, a first FET T1, and a bleeder resistor BLDR. The first resistor R1 and the second resistor R2 are dividing resistors and the first FET T1 is an electronic switching element for connecting or disconnecting a bleeder path depending on a voltage applied to a gate terminal through the first resistor R1 and the second resistor R2. Therefore, the first FET T1 is turned on when a voltage level of a divided driving voltage applied to the gate terminal through the first resistor R1 and the second resistor R2 is equal or to more than a turn-on voltage of the first FET T1 to make the bleeder current I_BLD flow through the bleeder resistor BLDR and is turned-off when the voltage level of the divided driving voltage applied to the gate terminal through the first resistor R1 and the second resistor R2 is under the turn-on voltage of the first FET T1 so as not to make the bleeder current I_BLD flow. Further, in FIG. 12A, a current value of the bleeder current I_BLD may be set by adjusting the magnitude in the bleeder resistor BLDR.

FIG. 12B illustrates waveforms of the bleeder current I_BLD and the driving current I_LED for the light emitting diode for one period of a rectified voltage Vrec in the exemplary embodiment in which the rectified voltage Vrec of which the phase is not controlled is provided as the driving voltage, for the exemplified purpose. As illustrated in FIG. 12B, the first FET T1 holds the turned-on state for a section in which the voltage level of the divided rectified voltage Vrec applied through the first resistor R1 and the second resistor R2 is equal or to more than the turn-on voltage of the first FET T1, such that the bleeder current I_BLD flows through the bleeder resistor BLDR for the section.

Meanwhile, it is to be noted that the bleeder circuit 350 described with reference to FIGS. 12A and 12B may be used along with the bleeder circuit 250 described with reference to FIGS. 10 to 11B.

Figure 13A:
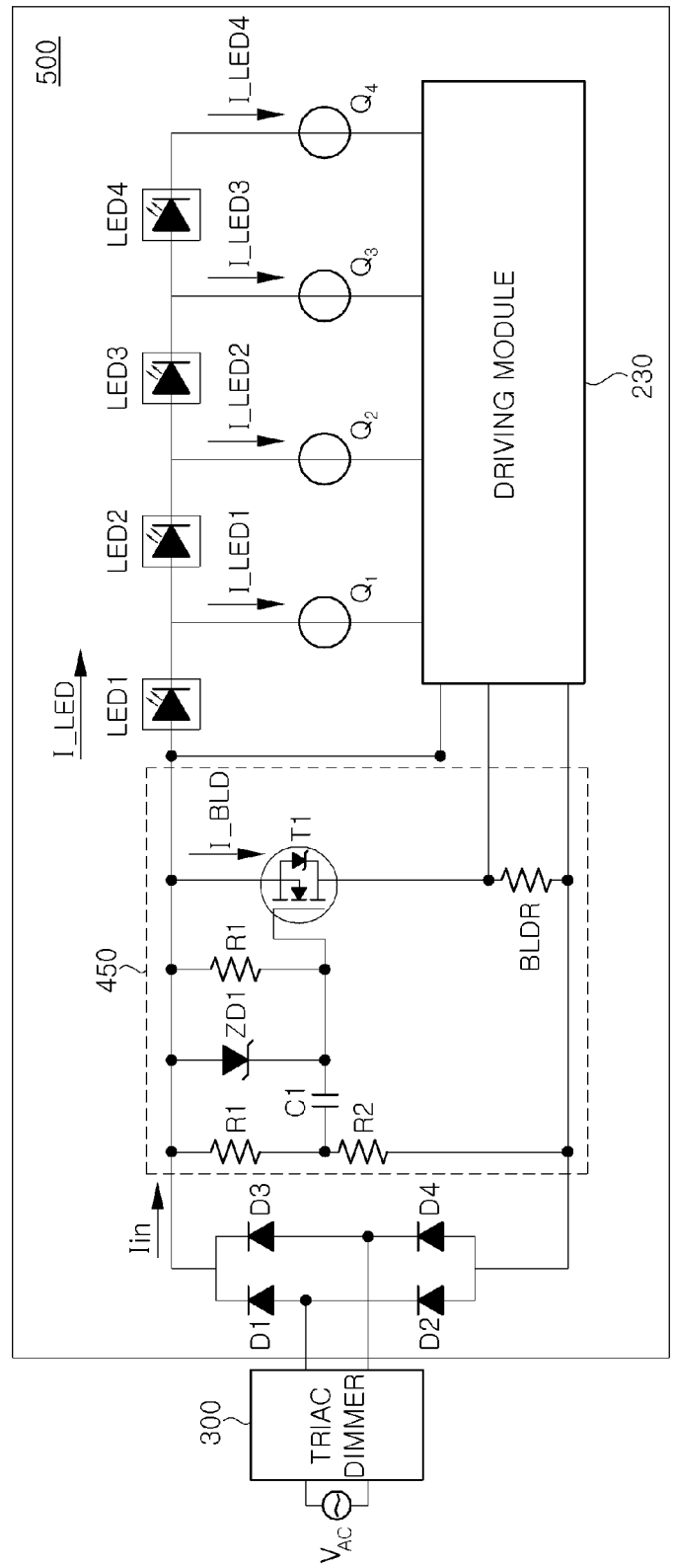
FIG. 13A is a diagram illustrating a driving circuit for a light emitting diode including a bleeder circuit and a lighting apparatus for a light emitting diode according to another exemplary embodiment of the present invention.
Figure 13B:
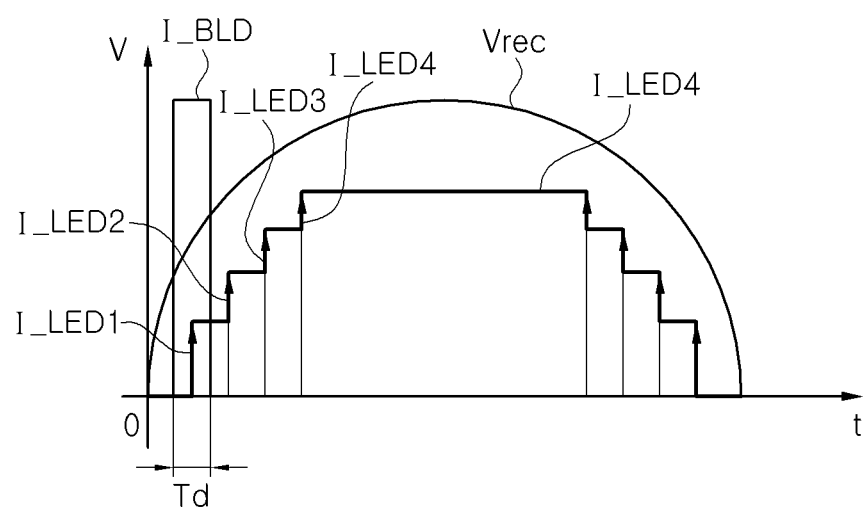
FIG. 13B is a diagram illustrating a bleeder current and a driving current for a light emitting diode which flow through the lighting apparatus for a light emitting diode illustrated in FIG. 13A.

FIG. 13A is a diagram illustrating a driving circuit for a light emitting diode including a bleeder circuit and a lighting apparatus for a light emitting diode according to another exemplary embodiment of the present invention and FIG. 13B is a diagram illustrating a bleeder current and a driving current for a light emitting diode which flow through the lighting apparatus for a light emitting diode illustrated in FIG. 13A. Hereinafter, the bleeder circuit and the driving circuit for a light emitting diode according to another exemplary embodiment of the present invention will be described with reference to FIGS. 13A and 13B.

As illustrated in FIG. 13A, the lighting apparatus 500 for a light emitting diode according to another exemplary embodiment of the present invention may include the driving circuit for a light emitting diode and the first to fourth light emitting diode groups LED1 to LED4, in which the driving circuit for a light emitting diode may be configured to include the rectifier 110, the driving module 230, and a bleeder circuit 450. In FIG. 13A, the rest components other than the bleeder circuit 450 may be substantially the same as the exemplary embodiments described with reference to FIGS. 10 to 11B. Therefore, the overlapping components will recite the description of FIGS. 10 to 11B. Hereinafter, the bleeder circuit 450 of FIG. 13A will be described mainly.

First, in the case of the bleeder circuit 350 illustrated in FIGS. 12A and 12B, as described above, the bleeder current I_BLD flows over the whole section in which the voltage level of the voltage applied to the gate terminal of the first FET T1 is equal to or more than the turn-on voltage level of the first FET T1. Therefore, the bleeder current I_BLD flows through the bleeder resistor BLDR even in the section in which the bleeder current I_BLD is not required, and therefore an unnecessary power loss may occur. Hereinafter, the problem will be described in detail.

In characteristics of the TRIAC dimmer 300, to turn-on and operate the TRIAC dimmer 300, a triggering current is required and to hold an operation state of the TRIAC dimmer 300, the holding current is required. Further, in the characteristics of the TRIAC, once the TRIAC is turned-on, as long as a current (that is, input current Iin input to the LED lighting apparatus 500 through the TRIAC dimmer 300) flowing through a first terminal and a second terminal of the TRIAC is only held to be equal to or more than a holding current value, even though the voltage of the gate terminal of the TRIAC is 0, the TRIAC dimmer 300 holds the turned-on state. Meanwhile, in characteristics of the lighting apparatus 500 for a light emitting diode based on the sequential driving scheme, the driving current I_LED for the light emitting diode does not flow for the section in which the voltage level of the driving voltage is under the first forward voltage level Vf1 of the plurality of light emitting diode groups and the driving current I_LED for the light emitting diode flows for the section in which the voltage level of the driving voltage is equal to or more than the first forward voltage level Vf1 of the plurality of light emitting diode groups. Therefore, considering the characteristics of the TRIAC dimmer 300 and the characteristics of the lighting apparatus 500 for a light emitting diode based on the sequential driving scheme together, when a minimum value (for example, in the exemplary embodiment described with reference to FIGS. 12A and 12B, a current value of the driving current I_LED1 for the first light emitting diode) of the driving current I_LED for the light emitting diode is equal to or more than the holding current value of the TRIAC dimmer 300, the separate bleeder current I_BLD is not required in the section in which the lighting apparatus 500 for a light emitting diode emits light (that is, section in which the driving current I_LED for the light emitting diode flows). Despite these characteristics, in the case of the bleeder circuit 350 illustrated in FIG. 12A, as can be appreciated from FIG. 12B, the bleeder current I_BLD flows through the bleeder resistor BLDR even in the section in which the bleeder current I_BLD is not required, and therefore the unnecessary power loss may occur. Further, the bleeder circuit 350 illustrated in FIG. 12A may set only the current value of the bleeder current I_BLD, and therefore compatibility of the bleeder circuit 350 with various TRIAC dimmers may be degraded.

The bleeder circuit 450 according to another exemplary embodiment of the present invention as illustrated in FIG. 13A is the bleeder circuit devised to solve the foregoing problems. To solve the foregoing problem, the bleeder circuit 450 as illustrated in FIG. 13A is configured to set a time when the bleeder current I_BLD flows through the bleeder resistor BLDR, that is, an on-duty time. In more detail, as illustrated in FIG. 13A, the bleeder circuit 450 according to another exemplary embodiment of the present invention may include the first resistor R1, the second resistor R2, a first capacitor C1, a first zener diode ZD1, a third resistor R3, the first FET T1, and the bleeder resistor BLDR. The first resistor R1, the second resistor R2, the first FET T1, and the bleeder resistor BLDR perform substantially the same functions as the corresponding components of the bleeder circuit 350 described with reference to FIG. 12A and therefore the overlapping components will recite the description of FIG. 12A.

The first capacitor C1 is connected between a node between the first resistor R1 and the second resistor R2 and the gate terminal of the first FET T1 and is configured to perform the core functions of the bleeder circuit 450. In more detail, the first capacitor C1 uses basic characteristics of a capacitor that does not pass a DC current or a low frequency AC current but passes a high frequency AC current. For example, the first capacitor C1 may be selected not to pass an AC current (rectified current of 120 Hz) of 60 Hz. Due to the first capacitor C1, the lighting apparatus 500 for a light emitting diode is connected to the AC power supply of 60 Hz and when the TRIAC dimmer 300 is not used, the first FET T1 is not operated at all and therefore the unnecessary power loss may be prevented. That is, the first capacitor C1 according to the exemplary embodiment of the present invention passes only the instant high frequency AC current generated when the TRIAC dimmer 300 is turned-on and supplies the high frequency AC current to the gate terminal of the first FET T1 to turn-on the first FET T1 and the TRIAC dimmer 300 may be configured to filter and cut-off a non-used, stable low frequency AC current of 60 Hz to hold the first FET T1 in the turned-off state. It will be understood that the AC frequency that the first capacitor C1 passes may be set by properly selecting physical characteristics such as capacitance of the first capacitor C1.

Meanwhile, when the TRIAC dimmer 300 is connected to the lighting apparatus 500 for a light emitting diode to turn-on a switch, a current of a very large frequency of tens of KHz instantly flows. In this case, the current passes through the first capacitor C1 to be applied to the gate terminal of the first FET T1 to turn-on the first FET T1. When the first FET T1 is turned-on, the bleeder current I_BLD flows through the bleeder resistor BLDR and when the current value of the bleeder current I_BLD satisfies the triggering current requirement for the used TRIAC dimmer 300, the TRIAC dimmer 300 is normally operated. As described above, the current value of the bleeder current I_BLD may be adjusted by determining the resistance value of the bleeder resistor BLDR as needed. In one exemplary embodiment, the bleeder resistor BLDR is configured as a variable resistor and thus may be configured to variously set the resistance value as needed.

The first zener diode ZD1 and the third resistor R3 are each connected in parallel between the first resistor R1 and the first FET T1. The third resistor R3 is a discharge resistor and is configured to discharge the voltage accumulated in the gate terminal of the first FET T1 to turn-off the first FET T1. The time when the gate voltage of the first FET T1 is discharged, that is, the on-duty time when the first FET T1 holds the turned-on state may be adjusted by adjusting the resistance value of the third resistor R3. In one exemplary embodiment, the third resistor R3 is configured as a variable resistor and thus may be configured to variously set the resistance value as needed. Meanwhile, as described above, in the exemplary embodiment in which the minimum value of the driving current I_LED for a light emitting diode is set to be equal to or more than the holding current value of the TRIAC dimmer 300 to remove the necessity of the separate bleeder current I_BLD in the section in which the lighting apparatus 500 for a light emitting diode emits light, to stably operate the TRIAC dimmer 300, the bleeder current I_BLD needs to be supplied until the lighting apparatus 500 for a light emitting diode at least starts to emit light (that is, timing when the voltage level of the driving voltage is equal to or more than the first forward voltage level Vf1). Therefore, the resistance value of the third resistor R3 is determined considering the situations and the on-duty time may be set correspondingly.

The TRIAC dimmers 300 connected to the lighting apparatus 500 for a light emitting diode according to the exemplary embodiment of the present invention may have the different triggering current value requirement and on-duty time requirement that are required according to the specifications of the TRIAC dimmer 300. In the case of using the bleeder circuit 450 as illustrated in FIG. 13A, the trigger current value and/or the on-duty time may be set according to the specifications of the TRIAC dimmer 300 and thus the compatibility for various TRIAC dimmers 300 may be excellent.

FIG. 13B illustrates waveforms of the bleeder current I_BLD and the driving current I_LED for the light emitting diode for one period of a rectified voltage Vrec in the exemplary embodiment in which the rectified voltage Vrec of which the phase is not controlled is provided as the driving voltage, for the exemplified purpose. As illustrated in FIG. 13B, the first FET T1 holds the turned-on state for an on-duty time Td and therefore the bleeder current I_BLD flows through the bleeder resistor BLDR for the on-duty time Td.

According to the exemplary embodiments of the present invention, the driving circuit and the lighting apparatus for a light emitting diode may detect the AC voltage modulated by the dimmer to apply different driving modes depending on each of the dimming levels so as to drive all of the light emitting diode groups for the section where the flicker occurs due to the resistance driving mode, thereby improving the flicker and sequentially drive the light emitting diode groups for the section where the flicker does not occur due to the sequential driving mode, thereby improving the flicker, the light efficiency, and the dimming characteristics.

Although various exemplary embodiments have been described hereinabove, the present invention is not limited to specific exemplary embodiments. In addition, components described in specific exemplary embodiments may be identically or similarly applied to other exemplary embodiments without departing from the spirit of the present invention.

What is claimed is:

1. A driving circuit for a light emitting diode connected to a TRIAC dimmer configured to modulate an input AC voltage depending on a selected dimming level, comprising:
   a rectifier configured to full-wave rectify the modulated AC voltage output from the TRIAC dimmer to generate and output a driving voltage;
   a driving module configured to receive the driving voltage of the rectifier to detect the selected dimming level and drive a plurality of light emitting diode groups depending on the detected dimming level; and
   a bleeder circuit configured to provide a bleeder current to the TRIAC dimmer only for a preset on-duty time,
   wherein a current value of the bleeder current is equal to or greater than a triggering current value of the TRIAC dimmer.

2. The driving circuit of claim 1, wherein the bleeder circuit is configured to set the on-duty time.

3. The driving circuit of claim 1, wherein a minimum current value of a driving current for the light emitting diode flowing through at least one of the plurality of light emitting diode groups is equal to or greater than a holding current value of the TRIAC dimmer.

4. The driving circuit of claim 1,
   wherein the bleeder circuit is configured to detect a driving current for the light emitting diode flowing through at least one of the plurality of light emitting diode groups, and control the magnitude of the bleeder current based on the detected driving current for the light emitting diode.

5. The driving circuit of claim 4, wherein the bleeder circuit is configured to not provide the bleeder current when the detected dimming level is equal to or greater than a preset threshold dimming level.

6. The driving circuit of claim 4, wherein:
   the bleeder circuit is configured to control the magnitude of the bleeder current to maintain a sum of the driving current for the light emitting diode and the bleeder current at a preset threshold current value; and
   the threshold current value is equal to or greater than a holding current value of the TRIAC dimmer.

7. A lighting apparatus comprising:
   a light emitting diode connected to a TRIAC dimmer configured to modulate an input AC voltage depending on a selected dimming level;
   a rectifier configured to full-wave rectify the modulated AC voltage output from the TRIAC dimmer to generate and output a driving voltage;
   a driving module configured to receive the driving voltage of the rectifier to detect the selected dimming level and drive a plurality of light emitting diode groups depending on the detected dimming level;
   the light emitting diode groups configured to emit light depending on a control of the driving module; and
   a bleeder circuit configured to provide a bleeder current to the TRIAC dimmer only for a preset on-duty time,
   wherein a current value of the bleeder current is equal to or greater than a triggering current value of the TRIAC dimmer.

8. The lighting apparatus of claim 7, wherein the bleeder circuit is configured to set the on-duty time.

9. The lighting apparatus of claim 7, wherein a minimum current value of a driving current for the light emitting diode flowing through at least one of the plurality of light emitting diode groups is equal to or greater than a holding current value of the TRIAC dimmer.

10. The lighting apparatus of claim 7,
wherein the bleeder circuit is configured to detect a driving current for the light emitting diode flowing through at least one of the plurality of light emitting diode groups, and control the magnitude of the bleeder current based on the detected driving current for the light emitting diode.

11. The lighting apparatus of claim 10, wherein the bleeder circuit is configured to not provide the bleeder current when the detected dimming level is equal to or greater than a preset threshold dimming level.

12. The lighting apparatus of claim 10, wherein the bleeder circuit is configured to control the magnitude of the bleeder current to maintain a sum of the driving current for the light emitting diode and the bleeder current at a preset threshold current value; and
the threshold current value is equal to or greater than a holding current value of the TRIAC dimmer.

13. A driving circuit for a light emitting diode connected to a TRIAC dimmer configured to modulate an input AC voltage depending on a selected dimming level, comprising:

a rectifier configured to full-wave rectify the modulated AC voltage output from the TRIAC dimmer to generate and output a driving voltage;
a driving module configured to receive the driving voltage of the rectifier to detect the selected dimming level and drive a plurality of light emitting diode groups depending on the detected dimming level; and
a bleeder circuit configured to provide a bleeder current to the TRIAC dimmer only for a preset on-duty time;
wherein the bleeder circuit is configured to detect a driving current for the light emitting diode flowing through at least one of the plurality of light emitting diode groups, and control the magnitude of the bleeder current based on the detected driving current for the light emitting diode.

14. The driving circuit of claim 13, wherein the bleeder circuit is configured to not provide the bleeder current when the detected dimming level is equal to or greater than a preset threshold dimming level.

15. The driving circuit of claim 13, wherein:
the bleeder circuit is configured to control the magnitude of the bleeder current to maintain a sum of the driving current for the light emitting diode and the bleeder current at a preset threshold current value; and
the threshold current value is equal to or greater than a holding current value of the TRIAC dimmer.

* * * * *